May 20, 1958     E. C. PERRIN     2,835,038
TAPE RULE AND EXTENSION
Filed March 8, 1957

INVENTOR.
EVERETT C. PERRIN,
BY
McMorrow, Berman + Davidson
ATTORNEYS.

2,835,038
TAPE RULE AND EXTENSION
Everett C. Perrin, Alexandria, Va.

Application March 8, 1957, Serial No. 644,872

5 Claims. (Cl. 33—138)

This invention generally appertains to improvements in measuring tape rules and particularly relates to improvements in measuring tapes of the thin and narrow type such as are used by surveyors.

A primary object of the present invention is to provide a measuring extension for a tape, such extension being flexible and constituting a prolongation of the tape at the free end thereof so as to ensure that a rapid, facile and accurate measurement can be taken from a selected point.

Another important object of the present invention is to provide an extension for a measuring tape, the extension being fixedly secured to the tape at a selected point inwardly of the free end and being adapted to overlie one side of the tape and extend therefrom as an axial prolongation thereof and the extension being provided with one scale of linear measurement that is the same in arrangement and progression as the tape and which extends up to the hook on the end of the tape and the extension being formed with a second scale of progression which is inverse to the first scale and which extends from the hook to the free end of the extension.

A further important object, in conjunction with the foregoing objects, is to provide an improved housing for the reel of the tape, the housing being provided with means for permitting the extension to be housed therein when the tape is fully wound on the reel.

A further important object of the present invention is to provide a sturdy, compact, efficient and easily used and carried tape and housing therefor.

The foregoing and ancillary objects are attained by this invention, the preferred embodiment of which is set forth in the following description and illustrated in the attached drawing, wherein.

Figure 1:
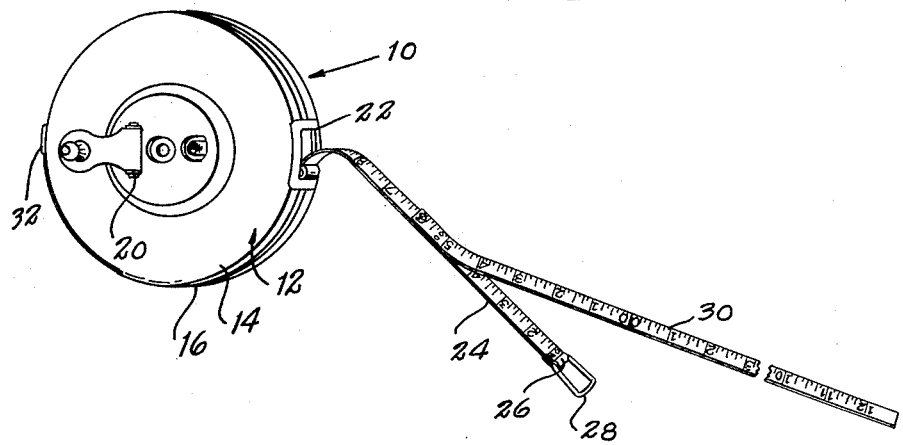
Figure 1 is a perspective view of the extension and a tape to which the extension is attached and showing the housing for the tape reel.
Figure 2:
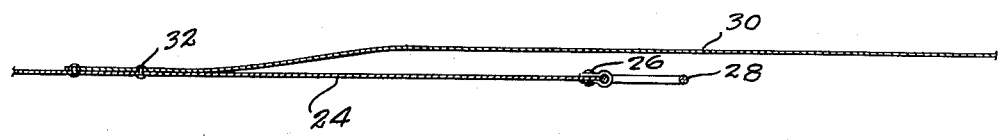
Figure 2 is a longitudinal cross-sectional view of the tape and the extension.

Referring now more particularly to the accompanying drawing, the numeral 10 generally designates a conventional measuring tape rule of the type referred to as a surveyor's tape. The tape rule includes a housing 12 consisting of circular side walls 14, that are spaced and connected by a peripheral wall 16, and which rotatably support a reel (not shown) that is rotated by the handle means 20. The peripheral wall 16 has a reinforced opening 22 for the tape 24 which is thin, narrow and very long and is usually made of a resilient ribbon metal. The tape has a free end which terminates in a fitting 26 by which a ring element 28 is pivotally attached to the end of the tape. The ring element is one inch long and constitutes the first inch of measurement of the tape.

In using the tape, the ring element may be placed over a fixed stop, such as a nail, and then the tape can be reeled out of the housing until the desired distance is ruled off. However, in surveying, the ring element will be held by hand over the specified point by one worker and then another will reel off the tape as he walks with the housing. Errors frequently occur because the ring element cannot be easily held over the specified point. In addition, errors occur because the worker holding the housing will be inexperienced and will not accurately select the correct fractional distance in the footage being laid off.

To overcome these difficulties and avoid these and other errors, I provide an extension 30 which is formed of the same material and stock as the tape and is coextensive in width therewith. The extension is fixedly secured at its inner end to one side face of the tape by rivet means 32 and extends beyond the tape as an axial prolongation thereof. The extension axially overlies one side face of the tape at the outer end portion and has its inner end portion provided with a scale that is identical with the tape. The extension is marked, at the point where it overlies the outer end of the ring element, with zeros and the outer end portion of the extension from such point to the outer free end thereof is marked with a scale that is arranged in opposite progression to the tape.

In using the extension, the ring element is placed over the specified point and then the extension is held in the hand so that a secure hold may be had and the pull on the tape will not cause the tape to be pulled so as to move the ring element off the specified point. The extension will enable the ring element to be maintained over the selected point in a secure and easy manner without directly holding the ring element.

If a distance that involves a fractional part of an inch is to be reeled off, for example, 30' 1¼", then the extension can be held so that the point on the extension at 1¼" outwardly of the zeros will overlie the specified point and the worker reeling out the tape need only find the 30' mark on the tape and hold it to locate the other point to be selected.

If a fixed stop is to be used then the ring element will be disposed over such stop, as is conventional. For this reason, the only modification of the tape is that involved in fixing the extension thereto.

Figure 3:
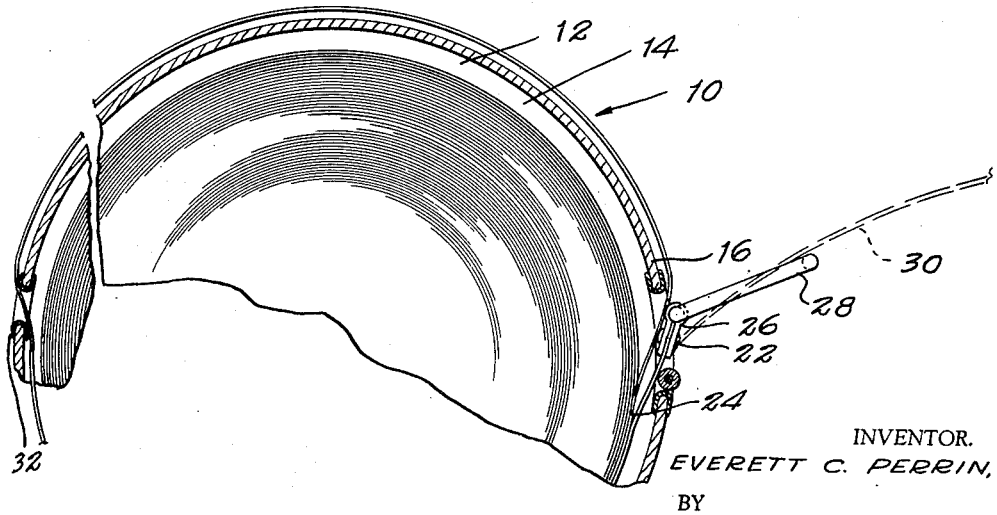
Figure 3 is a sectional view of the reel housing showing the means for permitting the extension to be housed in the housing.

In reeling up the tape, the ring element abuts the opening 22 and cannot enter the housing since, if it did, the tape end would become lost and the tape could not be unreeled. However, to permit the housing with the extension to be easily carried when the tape is reeled up, a reinforced slot 32 is formed in the peripheral wall 16 to receive the extension which is wrapped around the outside of the wall and then passed through the slot to the inside of the housing, as shown in Figure 3, and threaded over the outer coil of the coiled tape. This slot will permit the extension to be securely attached to the housing in a compact way so that the housing can be inserted into and carried in a pocket when not in use.

While the tape and extension have been disclosed as being formed from ribbon metal, it is obvious that other materials may be used and limitation is not intended, in this respect. Also, in this regard, since other uses and environments will occur to those skilled in the art limitation is sought only in accordance with the terms and spirit of the appended claims.

What is claimed is:

1. In combination with a flexible tape having a free end provided with a ring element, an extension comprising a length of tape affixed at one end to one side of the tape inwardly of the ring element and overlying one side and extending axially to constitute an axial prolongation of the tape and define means for holding the tape with the ring element overlying a specified point.

2. In combination with a flexible tape having a free end provided with a ring element, an extension comprising a length of tape affixed at one end to one side of the tape inwardly of the ring element and overlying one side and extending axially to constitute an axial prolongation of the tape and define means for holding the tape with the ring element overlying a specified point, said extension having an inner end portion, inwardly of the ring element, provided with a linear measurement scale the same as the tape and having an outer end portion, outwardly of the ring element, provided with a linear measurement scale of an inverse progression.

3. In combination with a flexible tape having a free end provided with a ring element, an extension comprising a length of tape affixed at one end to one side of the tape inwardly of the ring element and overlying one side and extending axially to constitute an axial prolongation of the tape and define means for holding the tape with the ring element overlying a specified point, said tape and extension being formed from the same ribbon type material.

4. In combination with a flexible tape having a free end provided with a ring element, an extension comprising a length of tape affixed at one end to one side of the tape inwardly of the ring element and overlying one side and extending axially to constitute an axial prolongation of the tape and define means for holding the tape with the ring element overlying a specified point, a housing for the tape including a pair of spaced circular walls having a peripheral wall connecting them, said peripheral wall having an opening for the passage of the tape into and out of the housing and having a slot for the passage of the extension into and out of the housing.

5. In combination with a flexible tape having a free end provided with a ring element, an extension comprising a length of tape affixed at one end to one side of the tape inwardly of the ring element and overlying one side and extending axially to constitute an axial prolongation of the tape and define means for holding the tape with the ring element overlying a specified point, a housing for the tape including a pair of spaced circular walls having a peripheral wall connecting them, said peripheral wall having an opening for the passage of the tape into and out of the housing and having a slot for the passage of the extension into and out of the housing, said slot and opening being diametrically opposed in the peripheral wall.

References Cited in the file of this patent
UNITED STATES PATENTS 2,770,883     Hackney               Nov. 20, 1956